United States Patent [19]

Nozawa et al.

[11] Patent Number: 4,497,028
[45] Date of Patent: Jan. 29, 1985

[54] NUMERICAL CONTROL SYSTEM

[75] Inventors: Ryoichiro Nozawa, Tokyo; Hideaki Kawamura, Hachioji, both of Japan

[73] Assignee: Fanuc Ltd., Minamitsuru, Japan

[21] Appl. No.: 305,787

[22] Filed: Sep. 25, 1981

[30] Foreign Application Priority Data

Sep. 30, 1980 [JP] Japan ................................. 55-136609

[51] Int. Cl.³ .......................... G05B 7/00; G05D 3/04; D05B 21/00
[52] U.S. Cl. .................................... 364/474; 364/468; 318/591; 318/53
[58] Field of Search ................... 364/474, 468; 318/53, 318/575, 590, 591, 696; 112/121.12

[56] References Cited

U.S. PATENT DOCUMENTS

| 3,611,102 | 10/1971 | Leenhouts | 318/696 |
| 3,771,477 | 11/1973 | Conner | 112/121.12 |
| 3,783,253 | 1/1974 | Anderson et al. | 235/151.11 |
| 3,882,368 | 5/1975 | Carleton | 318/591 |
| 4,027,222 | 5/1977 | Leenhouts | 318/591 |
| 4,092,720 | 5/1978 | Carey | 364/474 |
| 4,199,814 | 4/1980 | Rapp et al. | 364/474 |
| 4,424,569 | 1/1984 | Imazeki et al. | 364/468 |

FOREIGN PATENT DOCUMENTS

| 2644596 | 4/1977 | Fed. Rep. of Germany | 364/474 |
| 2019039 | 4/1979 | United Kingdom | 364/747 |

OTHER PUBLICATIONS

European Search Report completed Jun. 16, 1983, The Hague.

Primary Examiner—James D. Thomas
Assistant Examiner—William G. Niessen
Attorney, Agent, or Firm—Staas & Halsey

[57] ABSTRACT

A numerical control system in which a numerical control device is adapted to control a machine tool equipped with a plurality of tables, as one example, on which workpieces may be secured to be machined by a tool mounted on a head. A table which is not being controlled automatically by the numerical control device can be operated independently of the automatic operation network of the numerical control device and placed in a manual operation mode or manual data input mode in which the table can be moved manually even while the numerical control device controls the other table or tables automatically.

6 Claims, 5 Drawing Figures

Fig. 1
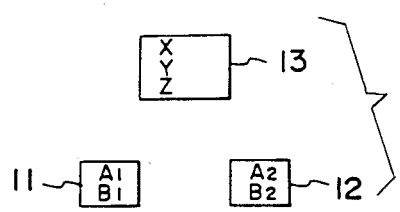
Fig. 3a
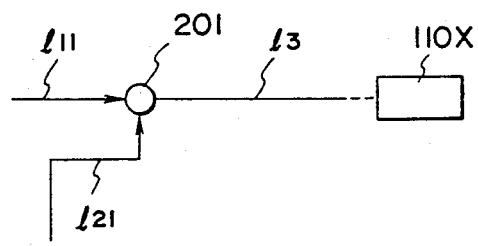
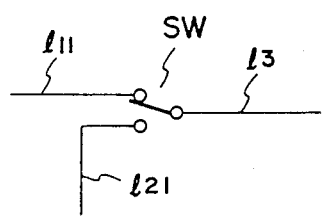
Fig. 3b

NUMERICAL CONTROL SYSTEM

BACKGROUND OF THE INVENTION

This invention relates to a numerical control system which enables simultaneous execution of machining work in an automatic operation mode and another task in a manual mode or manual data input mode.

Machine tools capable of being controlled by a numerical control device include multiple-table and multiple-head milling machines. To simplify matters, assume that such a milling machine has two tables and two heads corresponding to the respective tables. When the numerical control device controlling such a machine tool is operating in the automatic operation mode, one head of the machine is being controlled automatically by the numerical control device. This means that the other head cannot be controlled in the manual mode or manual data input mode, referred to hereinafter as the MDI mode. Therefore, when a workpiece placed on the table corresponding to the former head is being machined in the automatic operation mode by the tool mounted on said head, the other table corresponding to the latter head cannot be moved in the manual or MDI mode. Accordingly, when the operator wishes to prepare the other table and head combination for a subsequent machining operation, such as by setting a workpiece on the table or by applying a lubricating oil, he cannot do so because the former table and head combination is under the automatic control of the numerical control device. The preparatory work for the other machining operation must therefore wait until after the completion of machining being performed in the automatic operation mode. This prolongs total machining time and detracts from the efficiency of the system, partially cancelling the advantages of the expensive machine tool of the type described.

SUMMARY OF THE INVENTION

Accordingly, an object of the present invention is to provide a numerical control system in which at least those axes of a machine tool that are not being controlled automatically by being placed in an automatic operation mode are capable of being controlled in a manual mode or manual data input mode.

Another object of the present invention is to provide a numerical control apparatus for a multiple-head or multiple-table machine tool that allows one head or table to be operated manually while the other head or table is being operated automatically.

Other features and advantages of the present invention will be apparent from the following description taken in conjunction with the accompanying drawings.

BRIEF DESCRIPTION OF THE DRAWINGS

FIG. 1 is an illustrative view useful in describing the relationship between tables and control axes in a machine tool of the multiple table type, specifically a machine tool having two tables and one head;

FIGS. 3(A) and 3(B) are illustrative views useful in describing the external connections of a mixing circuit when such a circuit is employed in the arrangement of FIG. 2.

DESCRIPTION OF THE PREFERRED EMBODIMENTS

To facilitate the understanding of the present invention, we will assume that the invention is to be applied to a multiple-table machine tool in which two tables and one head are provided. Each table can be controlled along two axes, referred to as control axes, and the head, mounting a tool via a spindle, can be controlled along three axes. The relationship between a table and its control axes is illustrated in FIG. 1.

In FIG. 1, first and second tables are designated at numerals 11 and 12, respectively. The first table 11 has a control axis $A_1$ along which it is moved in a horizontal plane, and a control axis $B_1$, perpendicular to control axis $A_1$, along which it is moved in the same horizontal plane. Similarly, the second table has a control axis $A_2$ along which it is moved in a horizontal plane, and a control axis $B_2$, perpendicular to control axis $A_2$, along which it is moved in the same horizontal plane. Numeral 13 denotes a tool mounted on the head which is movably controlled along the X, Y and Z axes.

Next, assume that control is being performed simultaneously along the five axes associated with tool 13 and first table 11, namely the X, Y, Z, $A_1$ and $B_1$ axes, in accordance with commands read from a numerical control, NC tape. The tool 13, moving as commanded with respect to a workpiece placed upon the first table 11, machines the workpiece in the manner specified by the commands. While the foregoing is in progress, the second table 12 is not in the automatic operation mode under the control of the NC tape, and therefore can be moved by being placed in a manual mode or MDI mode in accordance with the present invention, as will be described below. The manual mode may, for example, be a jog feed operation performed by depressing a jog key, or a so-called handle feed operation performed by manipulating a handle. In any case, this permits the second table 12 to be prepared for a subsequent machining operation, such as by setting a workpiece on the table, even while the automatic operation mode under the control of the NC tape is in effect. With such an arrangement, the workpiece is set on the second table 12 so that it can be machined by the tool 13 immediately after the tool finishes machining the workpiece placed on the first table 11. This enhances efficiency since the tool standby time is shortened by carrying out most of the preparatory work in advance.

In a multiple-head machine tool, as opposed to the multiple-table machine tool described above, application of the present invention enables exchange of the tool mounted on the spindle head which is not operating in the automatic operation mode, even while the other head (assuming only two heads) is engaged in automatic machining work.

Figure 2:
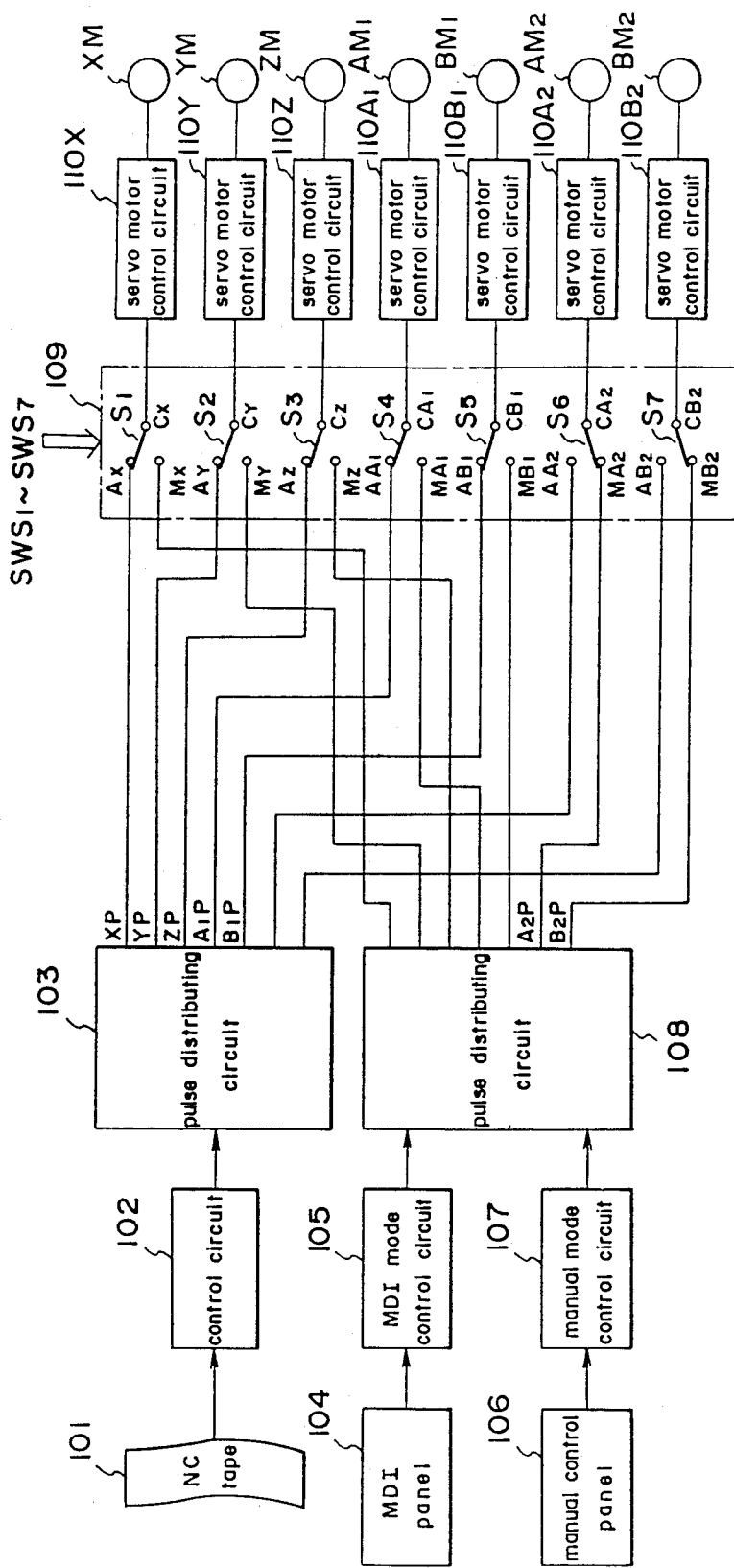
FIG. 2 is a circuit block diagram showing the principal portions of a numerical control apparatus in accordance with the present invention.

A numerical control apparatus embodying the present invention is illustrated in the block diagram of FIG. 2. Again, for the sake of simplicity, we will assume that the apparatus is applied to control of the machine tool having two tables and one head, as described in connection with FIG. 1. It should be noted, however, that the invention is similarly applicable to multiple-table and multiple-head machine tools having a plurality of tables and heads.

Referring now to FIG. 2, a numerical control tape, denoted at numeral 101, bears a punched program of numerical control instructions. A control circuit 102, composed of decoders and registers, receives commands in accordance with the instructions on the tape 101, and delivers an output to a pulse distribution circuit 103. Numeral 104 denotes an MDI panel connected to an MDI mode control circuit 105 which delivers output signals to a pulse distributing circuit 108. Numeral 106 denotes a manual control panel which includes a jog key, a handle pulse generator and the like. The output of the control panel 106 is connected to a manual mode control circuit 107 which also delivers signals to the pulse distributing circuit 108. The pulse distributing circuits 103, 108 deliver pulses to a switching circuit 109 having seven switches $S_1$ through $S_7$. The switches are changed over by respective switching signals $SWS_1$ through $SWS_7$ to selectively deliver the outputs from pulse distributing circuit 103 or from pulse distributing circuit 108 to servo motor control circuits 110X through $110B_2$. Pulse distributing circuit 103 is provided for automatic operation, and pulse distributing circuit 108 for the manual or MDI mode, as will be described later. Electronic switches such as transistors may be employed as the switches $S_1$ through $S_7$ in switching circuit 109. In such case, automatic/manual changeover switches, one for each of the seven control axes X, Y, Z, $A_1$, $B_1$, $A_2$, $B_2$, can be provided on the manual control panel 106, and it can be so arranged that the changeover signals $SWS_1$ through $SWS_7$ are generated by operating the respective switches. Alternatively, it can be arranged for the control circuit 102 to generate the changeover signals $SWS_1$ through $SWS_7$ upon sensing alphabetic codes (referred to hereinafter as word addresses) X, Y, Z, $A_1$, $B_1$, $A_2$, $B_2$, indicative of the respective control axes, from the NC tape 101. In another alternative arrangement, the signals can be generated by changeover commands (G code, M code, etc.) provided by the NC tape 101. The servo motor control circuits 110X through $110B_2$, of a type well-known in the art, control respective servo motors XM, YM, ZM, . . . , $BM_2$ for the respective axes X, Y, Z, . . . , $B_2$.

In operation, assume that a workpiece placed on the first table 11 of FIG. 1 is to be machined by the tool 13 in a manner specified by commands obtained from the NC tape 101. Also, assume the arrangement described above, in which the automatic/manual changeover switches (not shown) for the respective control axes are provided on the manual control panel 106. These switches are now manipulated by the operator to establish the automatic or manual condition for each control axis. It should be noted, however, that a first table/second table changeover switch can be provided on the manual control panel to effect the automatic/manual changeover collectively by manipulation of this switch. Or, as described above, it can be arranged for the changeover signals $SWS_1$, $SWS_2$, . . . , $SWS_5$ to be generated (i.e., to be set to logical "1"), thereby effecting the automatic/manual changeover, when the word addresses X, Y, Z, $A_1$, $B_1$, or the changeover commands (M code, G code, etc.), are read from the NC tape 101.

Following the automatic/manual changeover operation, a move command arrives from the NC tape 101, the control circuit 102 responding by delivering the command to the pulse distributing circuit 103 in appropriate form. The pulse distributing circuit 103 executes pulse distribution operations simultaneously for a maximum of five axes on the basis of the move command, producing pulses $X_p$, $Y_p$, $Z_p$, $A_1P$, $B_1P$. The switches $S_1$ through $S_5$, it should be noted, are switched over to the AUTO terminals $A_X$, $A_Y$, $A_Z$, $A_{A1}$, $A_{B1}$ as a result of the foregoing automatic/manual changeover operation. The distributed pulses $X_p$, $Y_p$, $Z_p$, $A_1P$, $B_1P$ therefore are sent through the switching circuit 109 to the respective servo motor control circuits 110X, 110Y, 110Z, $110A_1$, $110B_1$ which rotatively drive the servo motors XM, YM, ZM, $MA_1$, $MB_1$ in a well-known manner. The mentioned servo motors transport the first table 11 and the tool 13 along the five control axes X, Y, Z, $A_1$, $B_1$ as specified by the move command in order to machine the workpiece in the manner commanded.

In accordance with the invention, the second table 12 can be prepared for a subsequent machining operation while the tool 13 is machining the workpiece on the first table 11 in the automatic operation mode under the control of the NC tape 101. This is performed as follows. First, the operator manipulates the automatic/manual changeover switches located on the manual control panel 106, as in the above example, to connect switches $S_6$, $S_7$, corresponding to the control axes $A_2$, $B_2$ of the second table 12, to the MANUAL terminals $MA_2$, $MB_2$, respectively. This is the situation illustrated in FIG. 2. Next, the operator manipulates the jog key or handle pulse generator provided on the manual control panel 106 for movement along the $A_2$ axis or $B_2$ axis. This causes the pulse distributing circuit 108 to generate the distributed pulses $A_2P$, $B_2P$ which pass through the switches $S_6$, $S_7$, respectively, to enter the respective servo motor control circuits $110A_2$, $110B_2$. The servo control circuits respond by rotatively driving the $A_2$-axis and $B_2$-axis servo motors $AM_2$, $BM_2$, respectively. The above procedure permits the operator to move the second table 12 manually so that a workpiece can be set and positioned on the second table. This can take place while the first table and the tool are in the automatic operation mode, as mentioned above.

It is possible also to control the servo motors $AM_2$, $BM_2$ using the MDI panel 104 while the first table and the tool are in the automatic operation mode. This is accomplished as follows. First, the operator manipulates a digital switch (not shown) on the MDI panel 104 to enter one block of MDI commands, even while machining is being performed in the automatic operation mode. The MDI commands are applied to the pulse distributing circuit 108 through the MDI mode control circuit 105, and the pulse distributing circuit 108 responds by executing pulse distribution operations simultaneously for the two control axes $A_2$, $B_2$ on the basis of the MDI commands, thereby to generate distributed pulses $A_2P$, $B_2P$. These pulses are directed through the switches $S_6$, $S_7$ and enter the servo motor control circuits $110A_2$, $110B_2$, exactly in the manner described in connection with the manual operation. The servo control circuits control the respective servo motors $AM_2$, $BM_2$.

In the preferred embodiment described above, the axes not under the control of the NC tape while machining is being executed in the automatic operation mode, namely the axes $A_2$, $B_2$ in the example described, can be controlled in both the manual and MDI modes. It should be noted, however, that one of these two modes can be deleted. If only the manual mode is kept to control the axes which have not been placed in the automatic operation mode, the distribution operation performed by the pulse distributing circuit 108 need not rely on a DDA (digital different analyzer) system, MIT system or algebraic system. Furthermore, the switches $S_1$ through $S_7$ in switching circuit 109 employed in the preferred embodiment of FIG. 2 can be replaced by mixing circuits. Such an arrangement is shown in FIG. 3.

FIG. 3(A) shows the external connections of a mixing circuit 201, and FIG. 3(B) shows the external connections of a switch SW which it replaces in FIG. 2. An input line $l_{11}$ is connected to the pulse distributing circuit 103 (FIG. 2) for the automatic operation mode, an input line $l_{21}$ is connected to the pulse distributing circuit 108 (FIG. 2) for the manual control mode, and an output line $l_3$ is connected to one of the servo motor control circuits. Thus, when the mixing circuit 201 is used instead of the switch SW, the input lines $l_{11}$, $l_{21}$ are connected to the respective input terminals of the mixing circuit, and the output line $l_3$ to the output terminal of the mixing circuit.

Figure 4:
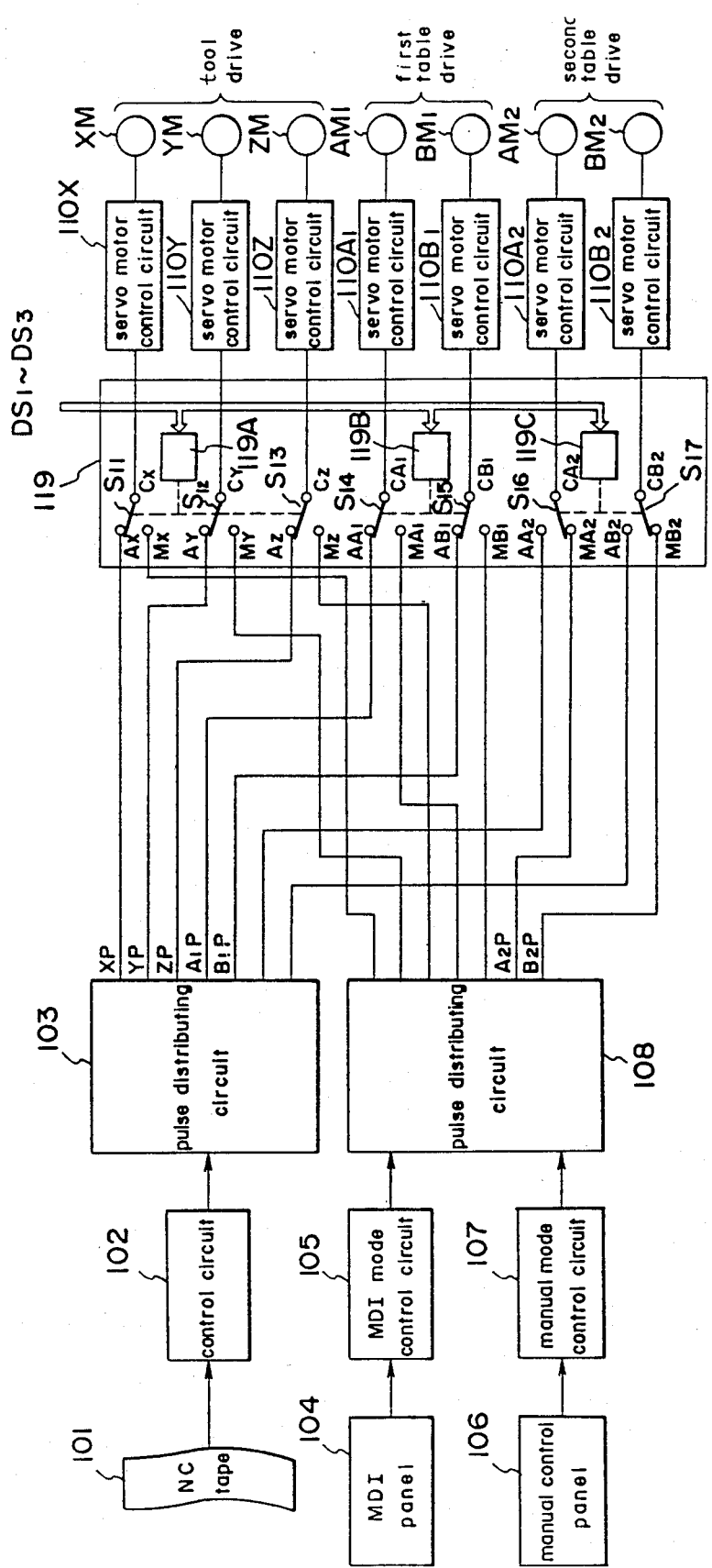
FIG. 4 is a circuit block diagram showing the principal portions of another embodiment of a numerical control apparatus in accordance with the present invention.

FIG. 4 illustrates a second embodiment of the present invention, in which parts similar to those of the arrangement shown in FIG. 2 are designated by like reference characters. In the arrangement of FIG. 4, a switching circuit 119 has changeover contactors $S_{11}$ through $S_{17}$, and changeover drivers 119A, 119B, 119C. Each contactor is composed of a contact portion connected to a corresponding one of the AUTO terminals $A_x$, $A_y$, $A_z$, $AA_1$, $AB_1$, $AA_2$, $AB_2$, another contact portion connected to a corresponding one of the MANUAL terminals $M_m$, $M_y$, $M_z$, $MA_1$, $MB_1$, $MA_2$, $MB_2$, and a movable member connected to the input side of a corresponding one of the servo motor control circuits 110X, 110Y, 110Z, 110A$_1$, 110B$_1$, 110A$_2$, 110B$_2$. The arrangement is such that the movable members of the changeover contactors $S_{11}$, $S_{12}$, $S_{13}$ are changed over simultaneously between the AUTOMATIC and MANUAL terminals by means of the changeover driver 119A. Likewise, the movable members of changeover contactors $S_{14}$, $S_{15}$, and the movable members of changeover contactors $S_{16}$, $S_{17}$, are changed over simultaneously by the changeover drivers 119B, 119C, respectively. The changeover driver 119A is actuated by a changeover signal $DS_1$ applied thereto. The changeover driver 119A changes over the contactors $S_{11}$ through $S_{13}$ to the AUTO terminals $A_x$ through $A_z$ when the changeover signal $DS_1$ is logical "1", and to the MANUAL terminals $M_x$ through $M_z$ when signal $DS_1$ is logical "0". Similarly, the changeover driver 119B, actuated by a changeover signal $DS_2$ applied thereto, changes over the contactors $S_{14}$, $S_{15}$ to the AUTO terminals $AA_1$, $AB_1$ when the signal $DS_2$ is a "1", and to the MANUAL terminals $MA_1$, $MB_1$ when the signal $DS_2$ is a "0", and the changeover driver 119C, actuated by a changeover signal $DS_3$ applied thereto, changes over the contactors $S_{16}$, $S_{17}$ to the AUTO terminals $AA_2$, $AB_2$ when the signal $DS_3$ is a "1", and to the MANUAL terminals $MA_2$, $MB_2$ when the signal $DS_3$ is a "0". The status of the switches shown in the arrangement of FIG. 4 is for a case where the changeover signals $DS_1$, $DS_2$ are both at logical "1" and changeover signal $DS_3$ is at logical "0". The tool 13 and the first table 11 therefore are in the automatic operation mode so that a workpiece mounted on the table 11 is being machined automatically by the tool 13 under the control of the NC tape. The second table 12 is concurrently manually operable by the manual control panel 106, or operable in the MDI mode by the MDI panel 104. In all other respects the embodiment of FIG. 4 operates in the same manner as that of FIG. 2 so that such operation need not be described again here.

In accordance with the embodiment shown in FIG. 4, only three changeover drivers need be provided for the changeover contactors constituting the switching circuit 119. This simplifies the circuitry for applying the signals which drive the switching circuit 119 and simplifies operation.

In accordance with the present invention as described above, axes which are not being controlled in accordance with an automatic operation mode can be controlled in a manual mode or manual data input mode. In a multiple-table machine tool, therefore, a table which is not being automatically controlled can be prepared for a subsequent machining operation, such as by setting a workpiece on the table, even while machining is being performed on a workpiece mounted on another table. In a multiple-head machine tool, on the other hand, the tool mounted on a spindle which is not participating in machining can be changed even while another spindle is engaged in a machining operation. Since table preparation and tool change operations can be carried out at the same time that machining is in progress, the machine tool need not stand by during the table preparation and tool change activities. This greatly enhances the machining efficiency of the system. While the present invention has been described in connection with preferred embodiments dealing with a multiple-table machine tool having only two tables, the invention can be applied, with minor modifications, to multiple-table machine tools having more than two tables, to multiple-head machine tools having two or more heads, and to machine tools having a plurality of tables and heads.

As many apparently widely different embodiments of the present invention can be made without departing from the spirit and scope thereof, it is to be understood that the invention is not limited to the specific embodiments thereof except as defined in the appended claims.

What we claim is:

1. A numerical control method for a machine tool having a plurality of controlled axes of movement, each axis having a manual operation mode, a manual data input mode and an automatic operation mode, which method comprises the steps of:
   operating at least some of the controlled axes of the machine tool in a mode other than said automatic operation mode, and
   executing simultaneously, machining work along some of said controlled axes in the automatic operation mode, and another task along at least some of the remaining controlled axes, in a mode other than said automatic operation mode.

2. A numerical control apparatus, having automatic control circuitry for providing automatic control pulses and manual control circuitry for providing manual control pulses, for controlling a machine tool having a plurality of axes controlled by respective servo control circuits each having an input terminal for selectively receiving one of manual control pulses and automatic control pulses, each axis having a manual operation mode, a manual data input mode and an automatic operation mode, said apparatus comprises:
   switching means responsive to a changeover signal for selectively connecting the input terminals of the servo control circuits to receive one of the automatic control pulse and the manual control pulse, wherein the servo control circuits for the axes to be controlled in an automatic operation mode are connected to the automatic control circuitry, and the remaining servo control circuits are connected to the manual control circuitry, and executing means operatively connected to said switching means, for providing said changeover signal, and for simultaneously executing machining work in the automatic operation mode, and executing another task in a mode other than the automatic operation mode.

3. A numerical control apparatus according to claim 2, wherein said switching means includes at least one mixing circuit, each mixing circuit operatively connected to said automatic control circuitry, to said manual control circuitry, and to a respective one of said servo control circuits, for mixing pulses delivered by the automatic control circuitry and pulses delivered by the manual control circuitry and for providing said mixed pulses to said respective one of said servo control circuits.

4. A numerical control apparatus according to claim 2, wherein said switching means includes a plurality of changeover contactors, each contactor operatively connected to said automatic control circuitry, to said manual control circuitry and to a respective one of said servo control circuits, and at least one changeover driver operatively connected to a predetermined number of said changeover contactors for actuating said predetermined number of said changeover contactors simultaneously.

5. A numerical control apparatus according to claim 2, wherein said switching means includes a plurality of changeover contactors, each contactor operatively connected to said automatic control circuitry, to said manual control circuitry and to a respective one of said servo control circuits, and a plurality of changeover drivers, each driver operatively connected to a predetermined number of said changeover contactors for actuating said predetermined number of said changeover contactors simultaneously.

6. A numerical control apparatus according to claim 2, 3, 4 or 5, wherein said executing means comprises:

first control means for receiving numerical control instructions and for providing first control signals responsive to said numerical control instructions;

first pulse generating means for receiving said first control signals and for providing said automatic control pulses in response to said numerical control instructions;

first input means for providing manual input data;

second control means for receiving said manual input data and for providing second control signals responsive to said manual input data;

second input means for providing manual control data;

third control means for receiving said manual control data and for providing third control signals responsive to said manual control data;

second pulse generating means responsive to said second control signals and said third control signals, for providing said manual control pulses; and changeover signal generating means responsive to said numerical control instructions and said manual control data, for providing said changeover signal.

* * * * *

UNITED STATES PATENT AND TRADEMARK OFFICE
CERTIFICATE OF CORRECTION

PATENT NO. : 4,497,028

DATED : January 29, 1985

INVENTOR(S) : Ryoichiro Nozawa et al.

It is certified that error appears in the above-identified patent and that said Letters Patent is hereby corrected as shown below:

Column 5, line 10, "$1_{11}$" should be -- $\ell_{11}$ --;

line 12, "$1_{21}$" should be -- $\ell_{21}$ --;

line 14, "$1_3$" should be -- $\ell_3$ --;

line 16, "$1_{11}, 1_{21}$" should be -- $\ell_{11}, \ell_{21}$ --;

line 18, "$1_3$" should be -- $\ell_3$ --.

Signed and Sealed this

Seventh Day of May 1985

[SEAL]

Attest:

DONALD J. QUIGG

*Attesting Officer*     *Acting Commissioner of Patents and Trademarks*